Figure 1:
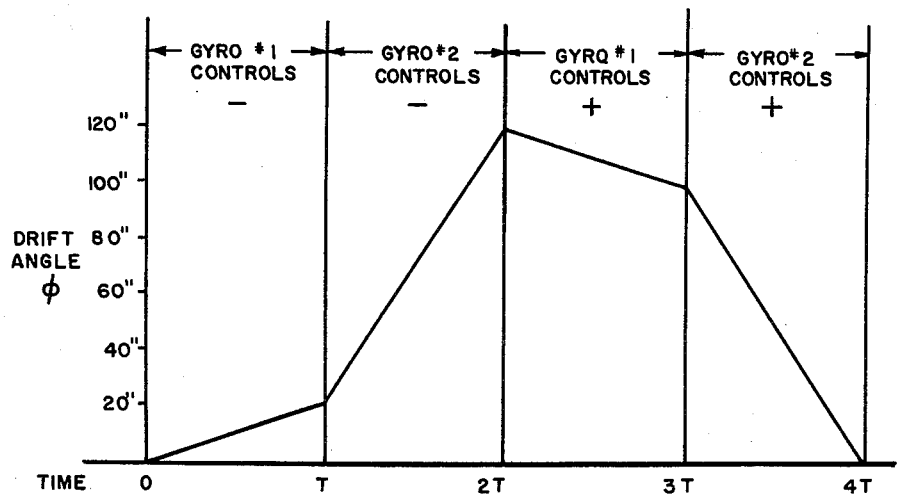

April 17, 1962 J. E. PICARDI ET AL 3,029,647
SELF-COMPENSATING GYRO APPARATUS
Filed Sept. 11, 1956 3 Sheets-Sheet 1

*INVENTOR.*
JOSEPH E. PICARDI
JOSEPH C. CROWLEY
BY
*Harold J. Downes*
ATTORNEY

INVENTOR.
JOSEPH E. PICARDI
JOSEPH C. CROWLEY
BY Harold J. Downes
ATTORNEY

April 17, 1962 J. E. PICARDI ET AL 3,029,647
SELF-COMPENSATING GYRO APPARATUS
Filed Sept. 11, 1956 3 Sheets-Sheet 3

INVENTORS
JOSEPH E. PICARDI
JOSEPH C. CROWLEY
BY

ATTORNEY

United States Patent Office 3,029,647
Patented Apr. 17, 1962

3,029,647
SELF-COMPENSATING GYRO APPARATUS
Joseph E. Picardi, Concord, and Joseph C. Crowley, Bedford, Mass., assignors to North American Aviation, Inc.
Filed Sept. 11, 1956, Ser. No. 610,442
12 Claims. (Cl. 74—5.37)

This invention relates to a smoothing system for utilizing data from two redundant sources, and particularly to a smoothing system for use in connection with a self-compensating gyro stabilized platform such as is disclosed in patent application Serial No. 200,234 filed December 11, 1950, now Patent No. 2,999,391, in the name of Darwin L. Freebairn et al. for "Self-Compensating Gyro Apparatus." The present application is a continuation-in-part of patent application Serial No. 257,854 filed November 23, 1951, now abandoned.

In the patent application of Freebairn et al. just referred to there is disclosed a stabilization system employing two gyroscopes for each axis about which stabilization is required. Briefly, the system contemplates control of the device being stabilized by one gyroscope for a predetermined period of time; then, control by means of the other gyroscope for a second period of time during which the first gyroscope is reversed in direction of rotation; followed by a third period in which the first gyroscope is again in control while the second gyroscope is reversed in direction of rotation. The generalized equation relating torques about the precession axis and drift rate of a single axis platform for a gyroscope system such as this is given by $$M_u = H\dot{\phi}$$

where $M$=resultant torque on precession axes (includes bearing, lead-in, and unbalance torques); $H = I\omega$ (angular momentum of gyro rotor); and $\dot{\phi}$=drift rate of the platform or device being stabilized. The drift angle is then $$\phi = \frac{M_u}{H} dt = \frac{M_u}{H} T$$

where T is a specified time interval. If H is periodically reversed in sign by reversing the gyro rotor spin direction, a cancellation of drift angle can be achieved as follows:

$$\phi_1 + \phi_2 = \frac{M_{u1}T_1}{H_1} + \frac{M_{u2}T_2}{H_2}$$

$$H_2 = -H_1$$

If $$\frac{M_{u1}T_1}{H_1} = \frac{M_{u2}T_2}{H_2}$$

the resultant drift angle will be zero.

Thus the principal object of this system is the reduction of such drift errors as are independent of gyro spin direction by use of the assumption that while the errors remain substantially the same in magnitude, the direction in which they affect the device being stabilized is reversed by reversal of the gyro spin direction. The system proposed in the above patent application of Freebairn et al. depends for its excellence upon the fact that it presupposes imperfect gyroscopes but achieves very nearly perfect results therefrom so long as the drift errors inherent in the gyroscopes remain independent of spin direction. Each gyroscope, then, is allowed to drift for a short time in one direction, carrying with it the apparatus being stabilized, after which it is removed from control of the apparatus, reversed in spin direction, and allowed to drift in the opposite direction, carrying with it the apparatus to be stabilized so that at the end of a number of such periods of approximately equal and opposite excursions the platform or other device being stabilized remains virtually in an undisplaced position. With relatively imprecise gyroscopes, however, the amount of each individual excursion from a given reference point may become quite large, and as is disclosed in FIG. 1, which shows the platform drift angle plotted against time, the platform actually passes through the drift-free position only twice during a whole cycle of operation. In addition, the device disclosed in the above patent application of Freebairn et al. may achieve incomplete cancellation of drift errors, because the time during which each gyroscope controls the platform orientation in each direction may not be precisely the same. In addition, although synchronous motors may be employed for driving the gyroscopes, the gyroscope rotor speeds in each direction may not be precisely equal. Finally, while it may be hoped that the principal errors to be compensated against are independent of gyro rotor spin direction, such may not be entirely the case. In addition, the source of error which gives rise to the drift which it is desired to compensate against may change somewhat during each of the time intervals under consideration.

This invention contemplates a smoothing system which reduces the total excursion of the platform from a drift-free position to a very small value.

To reduce this total excursion this invention contemplates apparatus for accomplishing the following steps:

(1) Measure the torque about the precession axis of gyro 1 while gyro 2 is controlling $$M_{1a} = M_{u(1)} + H_1\dot{\phi}$$

$$\dot{\phi} = \frac{M_{u(2)}}{H_2}$$

$$M_{1a} = M_{u(1)} + \frac{H_1}{H_2}M_{u(2)} \tag{1}$$

(2) Reverse gyro 1 spin direction and make the same measurement when full speed has been attained in the opposite direction $$M_{1b} = M_{u(1)} - H_1\dot{\phi}$$

$$M_{1b} = M_{u(1)} - \frac{H_1}{H_2}M_{u(2)} \tag{2}$$

(3) Adding and subtracting these results gives the following, since $$H_1 = H_2$$
$$M_{1a} + M_{1b} = 2M_{u(1)}$$
$$M_{1a} - M_{1b} = 2M_{u(2)}$$

(4) Add Equations 1 and 2 to give $M_{u(1)}$; then perform a similar operation with gyro 2 to obtain $M_{u(2)}$.

(5) Apply $-M_{u(1)}$ and $-M_{u(2)}$ to their respective gyros, causing the excursions of $\phi$ to approach zero.

While this invention is described and illustrated with particular reference and application to the use of two identical gyroscopes for stabilizing a single axis of a gyro stabilized platform, the invention, broadly, is to be understood to be applicable to any two devices the function of which is to measure the same quantity and maintain said quantity at a mean value.

It is therefore an object of this invention to provide a smoothing system for a self-compensating gyro stabilized apparatus.

It is another object of this invention to provide a smoothing system for utilizing information from two redundant sources thereof.

It is another object of this invention to provide a smoothing system for gyro stabilized apparatus which eliminates large excursions from a drift-free position of said apparatus.

It is another object of this invention to provide a method of operating gyro stabilized apparatus to eliminate large excursions thereof from a drift-free position.

It is another object of this invention to provide an improved smoothing apparatus.

Figure 3:
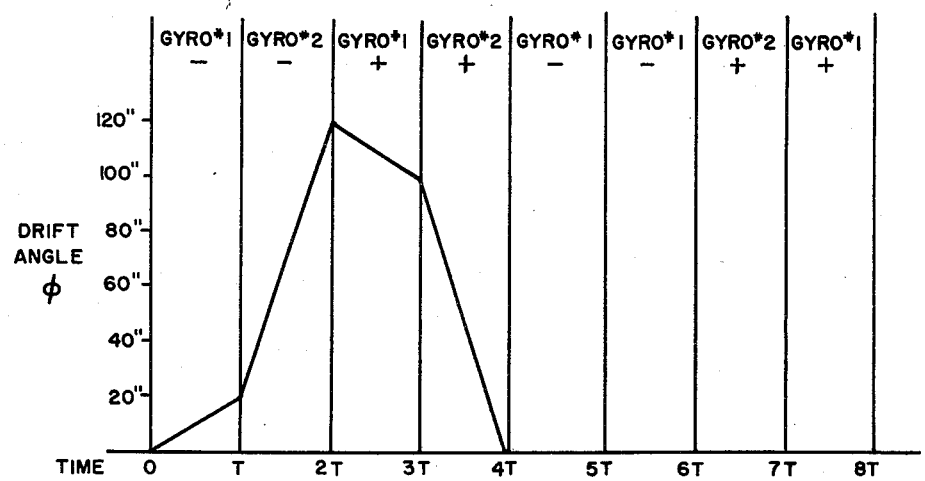
Figure 4:
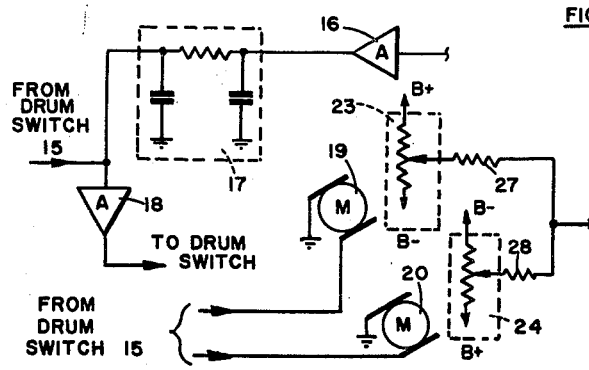
Figure 2:
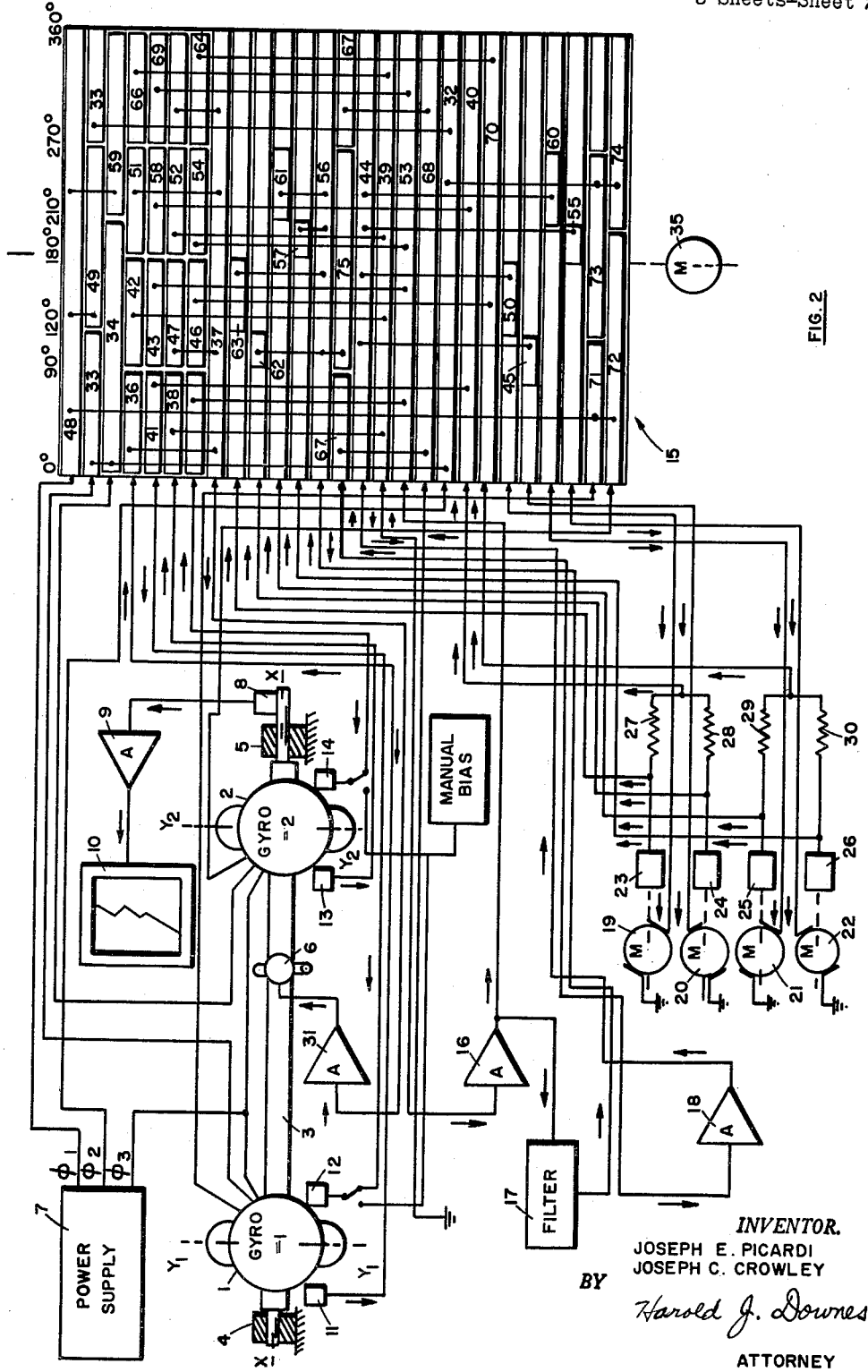
Figure 5:
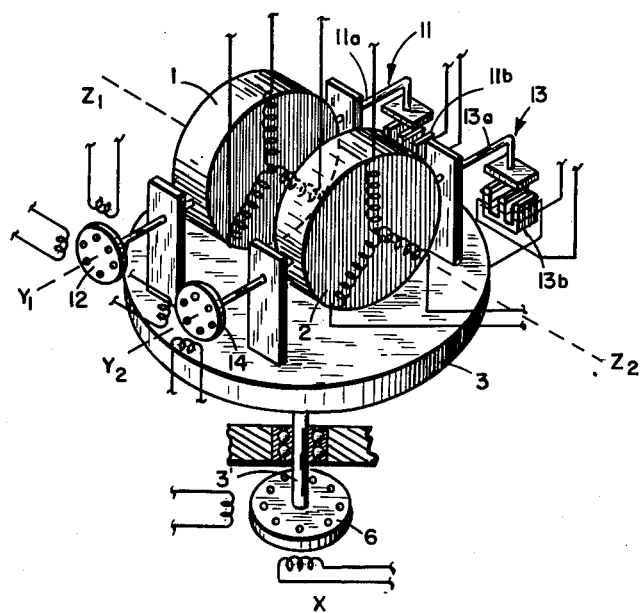

Other objects of invention will become apparent from the following description taken in connection with the accompanying drawings, in which FIG. 1 is a plot of platform drift angle vs. time;
FIG. 2 is a schematic drawing of the invention;
FIG. 3 is a plot of platform drift angle vs. time, wherein the improved smoothing apparatus of this invention is utilized;
FIG. 4 is a detailed schematic view of the preferred information storing circuit utilized in FIG. 2, and
FIG. 5 shows an exemplary arrangement of conventional structural features of the invention such as shown in the application of Freebairn et al.

Referring now to FIG. 1, let it be assumed that a gyroscopically stabilized apparatus, such as is shown in FIG. 1 of the above patent application to Freebairn et al., is being utilized with one gyro having an imperfection such that in a certain time interval "T," a net excursion of the platform of 20 seconds of arc is incurred. Let it be further assumed that the second gyroscope has inherent in it qualities which result in an error of 100 seconds of arc in an entire period so that FIG. 1 is a plot of platform drift angle against time. It will be seen that after interval "T," the platform has drifted 20 seconds; at time 2T it has drifted 120 seconds; at time 3T, since gyro 1 is again in control but is spinning in the opposite direction, the platform drift has been reduced by 20 seconds to 100 seconds, and at the completion of the cycle the platform drift has been reduced to zero, since gyro 2 has been reversed in spin direction. Thus, the platform has been oriented with zero drift angle only twice during the entire cycle. In addition, the total excursion of the platform from zero drift angle has amounted to 120 seconds—a value which may be objectionable in view of the length of time involved.

Referring now to FIG. 2, there is shown schematically a pair of gyros 1 and 2 mounted upon a platform 3 which is to be stabilized in bearings 4 and 5 attached to fixed structure. Line X—X through the center line of bearings 4 and 5 defines the common input axis of gyros 1 and 2. Platform stabilization is actually accomplished by torquer 6 which exerts a torque about axis X—X and is similar to that shown in the above patent application of Freebairn et al. A power supply 7 provides periodically reversed three-phase power to the synchronous motors of gyros 1 and 2 through the rotary switch to be hereinafter described. A pickoff 8, referenced to fixed structure, provides an electrical signal proportional to the deflection of the platform about its stabilization axis X—X which is amplified in recorder amplifier 9 and recorded by recorder 10 to provide a record of the platform excursions similar to that plotted in FIGS. 1 and 3. Gyroscope 1 is provided with a pickoff 11 and a torquer 12. Likewise, gyroscope 2 is provided with a pickoff 13 and a torquer 14. These pickoffs and torquers are identical to those shown and described in the above patent application of Freebairn et al. and are positioned to detect and apply torques about the output or precession axes $Y_1$—$Y_1$ and $Y_2$—$Y_2$ of gyroscopes 1 and 2 respectively. The spin axis of gyroscope 1 is perpendicular to the plane of axes X—X and Y—Y. The spin axis of gyroscope 2 is perpendicular to the plane of axes X—X and $Y_2$—$Y_2$. A drum switch 15, similar to drum switch 15 of FIG. 1 of the above patent application of Freebairn et al., is provided for performing the various switching operations required by this invention. Signals from one or the other of the gyroscope pickoffs are fed through caging amplifier 16 and filter 17 to servo amplifier 18 which in turn drives one of motors 19, 20, 21, or 22 which are in turn shaft-connected to helipots 23, 24, 25, and 26. The outputs of these helical potentiometers are fed through resistances 27, 28, 29, and 30 back to one of torquers 12 or 14. Torquer 6 is actuated by a signal from one of the gyroscope pickoffs, which is amplified in amplifier 31.

It is to be understood that the gyros, pickoffs and torquers may be well-known and conventional elements the details of which form no part of this invention. An exemplary structural arrangement of conventional elements (identical with that of the above mentioned applications of Freebairn et al.) in a system such as that illustrated in FIG. 2, is depicted in FIG. 5 wherein the platform 3 having freedom for rotation on a shaft 3' disposed along the input axis X—X is supported by bearings on some solid structure. The shaft 3' is illustrated as connected to torque motor 6 though it will be readily appreciated that the torque motor may be connected to the platform in any conventional arrangement. Supported on platform 3 for a single degree of angular freedom about precessional or output axes $Y_1$ and $Y_2$ are gyroscopes 1 and 2 respectively. The precessional axes are conventionally arranged to be normal to both the gyro spin axes $Z_1$, $Z_2$ and the input axis. Torque motors 12 and 14 are attached to the respective output axes $Y_1$ and $Y_2$ as are elements 11a and 13a of conventional E pickoffs 11 and 13. The E cores 11b and 13b of the pickoffs are fixed to the platform. Thus, each pickoff will detect output axis precession of its associated gyroscope and each torquer 12 and 14 will torque or rotate its associated gyroscope about the output axis thereof.

Operation of the device can best be understood with reference to FIG. 2 by following through an entire cycle of operation. Assuming that gyro 1 is initially in control of stabilization axis X—X and both gyroscopes 1 and 2 are rotating in the negative direction. Phase $\phi_1$ of power supply 7 is initially connected through strips 48, 71 and 72 of drum switch 15 to a winding of the motors of each of gyros 1 and 2. Phase $\phi_2$ of the power supply is connected through drum switch strips 32, 33, and 34 to a second winding of the motor 1 of gyros 1 and 2. Phase $\phi_3$ is directly connected to the third motor winding of gyros 1 and 2. Drum switch 15, of course, is rotated at a constant low speed by motor 35. At the outset of the cycle to be discussed let it be assumed that gyro 1 is in control of the platform and that its pickoff 11 is connected to the input of amplifier 31 through strips 36 and 37 upon drum switch 15. These various strips upon drum switch 15 are conductive so that surface contacts made therewith by means of brushes such as those shown in FIG. 4 of patent application Serial No. 200,234, now Patent No. 2,999,391, allow the conduction of electricity to the strips and to such other strips as are tied thereto by the ties indicated schematically in FIG. 2. During this first period of time, gyro 2 is caged by its own pickoff signal so that pickoff 13 is connected to the input of caging amplifier 16 through strips 38 and 39. In addition, torquer 12 may be assumed to be actuated by a signal which is proportional to some previously recorded error upon helical potentiometers 23 and 24, which is fed through strips 40 and 41 of drum switch 15. If helical potentiometers 23 and 24 contribute no voltage, then the platform will drift in accordance with the plot shown in FIGS. 1 and 3.

Referring now to FIG. 4, a schematic drawing of the preferred circuit for adjusting the outputs of helipots 23 and 24 to yield voltages proportional to the caging torque while gyro 1 is caged and rotating in positive and negative directions is shown. In FIG. 4, the connections to and from drum switch 15 are the same as in FIG. 2. Helipots 23 and 24 are preferably connected across a positive and negative source (not shown) of potential. The wipers of potentiometers 23 and 24 pick off potentials as a function of their position. It is apparent from FIG. 2 that while drum 15 is rotating from 90°–120° the interconnections on the drum connect the output of amplifier 18 to motor 20 and the wiper of potentiometer 24 to the input to amplifier 18, and while drum 15 is rotating from 120°–180° the drum connects the output of amplifier 18 to motor 19 and the wiper of potentiometer 23 to the input of amplifier 18. At all other times drum 15 maintains open circuits between amplifier 18 and the motors and between the potentiometer wipers and the input to amplifier 18, as shown in FIG. 2.

In operation, from 90°–180° rotation of drum 15 amplifier 16 is subjected to the output of pickoff 11. Filter 17 which is a conventional RC filter removes any ripple from this amplified output and produces a D.-C. potential which is proportional to the caging torque of gyro 1. With the drum making connections between the wiper of potentiometer 24 and the input to amplifier 18 and between the output of amplifier 18 and motor 20, this D.-C. potential from filter 17 is compared to the D.-C. potential of the wiper of potentiometer 24 at the input to amplifier 18. Servo amplifier 18 is sensitive to the deviations of its input from a neutral or ground potential. Assume, for purposes of illustration, that the output of filter 17 is initially equal in magnitude and opposite in polarity to the output of helipot 24 and that under the conditions just outlined the voltage input to amplifier 18 is at neutral or ground potential. If now the output from filter 17 increases in a positive direction, the input to amplifier 18 is a positive potential. This positive potential is detected by servo amplifier 18 which actuates motor 20 to drive the wiper of potentiometer 24 in a direction to make the output potential of potentiometer 24 more negative. Motor 20 continues to be energized until the outputs from filter 17 and potentiometer 24 are again in a balanced condition, i.e., the input to amplifier 18 is again at neutral or ground potential.

Similarly from 120°–180° rotation of drum 15 the servo loop consisting of amplifier 18 and motor 19 effectively positions the wiper of potentiometer 23 in accordance with the new caging torque signal as evidenced by the output from filter 17. It is to be noted that at 120° rotation of drum 15 the spin direction of gyro 1 is reversed in the manner indicated above.

As soon as the first 90° of rotation of drum switch 15 has been accomplished a second phase of operation begins. As shown in FIG. 2, pickoff 13 of gyroscope 2 is now connected to air jet torquer 6 through amplifier 31 and strips 37 and 47. Gyroscope 2 is therefore in control of stabilization axis X—X. Pickoff 11 is now connected to caging amplifier 16 through strips 42 and 39, by caging amplifier 16 is connected to torquer 12 by connection through strips 43 and 53. Gyro 1 is thus caged by its own pickoff signal. Caging amplifier 16, however, is also connected to filter 17. The output of filter 17 is compared to the output of helipot 24. The algebraic sum of the two output signals is connected to servo amplifier 18 through strips 56 and 75. The output of servo amplifier 18 actuates motor 20 through strips 44 and 45. Motor 20 rotates helipot 24 until its voltage output is equal in magnitude and opposite in sign to the output of filter 17, at which time the signal output of servo amplifier 18 is zero, and motor 20 stops rotation. The output of helipot 24 is connected to the output of filter 17 through strips 56 and 62. Meanwhile, the outputs of helipots 25 and 26—these helipots having previously been rotated to yield voltages equivalent to filter pickoff signals in previous cycles—are fed to torquer 14 of gyro 2 through strips 70 and 46. Torquer 14 exerts a compensating torque about the precession axis $Y_1$—$Y_1$ of gyro 2 of a predetermined amount to be hereinafter established. During this phase, then, gyro 2 is in control of the platform, still operating in the negative direction, and gyro 1 is being caged while being allowed to rotate still in the negative direction.

When drum switch 15 has been rotated approximately 120°, gyro 2 is still in control of the platform, but gyro 1 is reversed in direction by reversing the connections between phase $\phi_1$ and $\phi_2$ of power supply 7 and the first and second motor windings of gyro 1. Phase $\phi_1$ is now connected through strips 48 and 49 to the second motor winding of gyroscope 1 while phase $\phi_2$ is connected through strips 32 and 73 to the first motor winding of gyroscope 1. Pickoff 11 remains connected to caged torquer 12 through caging amplifier 16. The output of caging amplifier 16 continues to be connected to filter 17. The output of filter 17 is compared to the output of helipot 23 and the algebraic sum of the two outputs is connected to servo amplifier 18, the output of which is connected through strips 44 and 50 to motor 19 which turns helipot 23 until its voltage output is equal in magnitude and opposite in sign to the output of filter 17. The output signal of helical potentiometer 23 is connected to the output of filter 17 through strips 56 and 63 interconnected as shown in FIG. 2.

At 180° rotation of drum switch 15, gyro 1 is rotating in the positive direction while gyro 2 is rotating in the negative direction, and gyro 1 assumes control of the platform, with its pickoff 11 connected to amplifier 31 and torquer 6 through strips 51 and 37. Gyro 2 is now caged by its own pickoff, since pickoff 13 is connected through strips 52 and 39 to caging amplifier 16, the output of which is connected to torquer 14 through strips 53 and 54. The output of caging amplifier 16 is also fed through filter 17 and servo amplifier 18 to rotate motor 22 through strips 55 and 44 until the output voltage of helipot 56 is equivalent to the output of filter 17, helipot 26 being connected to the output of filter 17 through strips 56 and 57. Gyro 1 is now in control. A compensating torque proportional to the combined outputs of helipots 23 and 24 is applied about the precession axis $Y_2$—$Y_2$ of gyro 2 by caging torquer 14 which is connected through strips 58 and 40 and resistors 27 and 28 to the output of helipots 23 and 24.

At a drum rotation of 210°, gyro 2 is reversed by reversing the connections between phase $\phi_1$ and $\phi_2$ of power supply 7 and the first and second motor windings of gyroscope 2. Phase $\phi_1$ is now connected through strips 48 and 59 to the second motor winding while phase $\phi_2$ is connected through strips 32 and 74 to the first motor winding of gyroscope 2. Gyro 1 remains in control, with gyro 2 caged as before by its own pickoff signal. The output of filter 17 is compared with the output of helipot 25 through strips 56 and 61. The algebraic sum of the two outputs is connected through strips 56 and 75 to servo amplifier 18. The output of servo amplifier 18 is connected to actuate motor 21 through strips 44 and 60. Helical potentiometer 25 is thus rotated until its voltage output is equivalent to but opposite in polarity to the output of filter 17. During this period, gyro 1 is in control of the platform and is rotating in a positive direction. Its pickoff controls the platform torquer, but gyro 1 is being torqued by an amount proportional to the average error torques on gyro 1 measured when gyro 1 was turning both in the positive and negative directions during previous periods in which gyro 2 was in control. In other words, helipot 23 was, in a previous period, turned until its output voltage was equivalent to the input to torquer 12, while gyro 1 was rotating in a positive direction and caged by its own pickoff signal. This setting of helipot 23 was made while drum switch 15 was rotating from 120° to 180°. Likewise, helipot 24, was, in a previous period, turned until its output voltage was equivalent to the input to torquer 12, with gyro 1 turning in the negative direction. This setting of helipot 24 was made while drum switch 15 was rotating from 90° to 120°. Thus, helipots 23 and 24 have "remembered" or stored the magnitude of the signal required to cage gyro 1 while gyro 2 was in control of the platform during periods when gyro was spinning in positive and negative directions, respectively. Gyro 1 is thus torqued by an amount intended exactly to compensate for drift errors inherent in the gyroscope so that instead of taking a marked excursion from the driftless position of the platform, the platform now drifts only to the extent that the previous measurements of drift undertaken while the platform was under the control of gyro 2 were inaccurate or an inadequate prediction of present conditions.

At 270° rotation of drum 15, the outputs of helipots 25 and 26 are summed through resistances 29 and 30 and fed through strips 70 and 64 to torquer 14. Since helipots 25 and 26 were previously turned to yield voltages proportional to the inputs to torquer 14 while gyro 2 was turning in the positive and negative directions, respectively, the signal fed to torquer 14 represents an average value of the error to be compensated in compliance with steps 4 and 5 previously outlined; and since helipots 25 and 26 have been turned to yield a voltage equal in magnitude but opposite in sign to the respective inputs to torquer 14, a signal fed to torquer 14 is in the sense necessary to torque gyro 2 so that the platform remains very nearly properly oriented. The result of this technique of smoothing is shown graphically in FIG. 3, where during the first four periods illustrated it is assumed that helipots 23, 24, 25, and 26 were not previously set to yield an output error voltage to the gyro torquers. But during the succeeding four periods of time, the helipots have been turned to the required value so that the result is essentially an undrifted platform. This statement needs to be qualified to the extent that the factors producing the errors being compensated might change from time period to time period so that small excursions may occur even with the smoothing system herein described. However, to the extent that these small excursions tend to be uniform, they are eventually reduced until they approach zero.

In the time period beginning at 270° rotation of the drum, gyro 2 is rotating in the positive direction and is, as shown in FIG. 2, in control of the platform. Gyro 1, however, has been reversed by reversing the connections between phase $\phi_1$ and phase $\phi_2$ and the motor windings of gyroscope 1. Gyro 1 is caged upon its own pickoff signal through strips 66 and 39, and servo amplifier 18 is grounded by connection through strips 67 and 68. Torquer 12 is connected to caking amplifier 16 through strips 69 and 53.

At 360° rotation of the drum, the stage of operation initially discussed is repeated, with the outputs of helipots 23 and 24 being summed through resistances 27 and 28 and fed through strips 40 and 41 to torquer 12 of gyro 1, gyro 1 now being in control of the platform. The foregoing explanation with respect to the effect upon excursions of the platform from a drift-free position of the stored error signals in helipots 23 and 24 applies equally in this stage of operation.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A smoothing system for a self-compensating gyro stabilized device having a torquer and two parallel input axis reversible gyroscopes each of which has a precession axis position pickoff and torquer comprising means for alternating control of said device torquer between said gyroscopes, means for periodically reversing the spin direction of each of said gyroscopes alternately while it is not in control of said device torquer, means for storing the output of each of said pickoffs for each spin direction of each of said gyroscopes while it is not in control of said device, and means for applying a function of said stored output to said gyroscope torquers while said gyroscopes are in control of said device.

2. A device as recited in claim 1 in which said means for storing comprises a plurality of adjustable voltage sources, means for comparing the output of said voltage sources with said pickoff outputs, and means for adjusting said voltage sources to be equal in magnitude and opposite in sign to said outputs.

3. Self-compensating gyroscope apparatus comprising a platform to be stabilized about an axis in space, a first gyroscope mounted on said platform with its input axis parallel to said axis in space, a position pickoff for generating an electrical signal proportional to precession of said gyroscope, a torquer responsive to electrical signals for producing precession of said gyroscope, a second gyroscope mounted on said platform with input axis parallel to said axis in space, a pickoff for generating an electrical signal proportional to the precession of said second gyroscope, a torquer for producing precession of said second gyroscope, torquer means for producing stabilizing torques on said platform, means for periodically reversing the spin direction of said gyroscopes, means for operating said platform torquer in response to the pickoffs on each of said gyroscopes alternately, means for alternately controlling said platform torquer in response to each of said pickoffs and in coordination with said reversing means, means for torquing in response to its own pickoff signal that gyroscope not currently controlling said platform torquer, means for storing the greatest value of said pickoff signal during such time as it is being applied to the non-controlling gyroscope's own torquer in each direction of rotation of each said gyroscope, and means for applying to the torquer of each said gyroscope a signal proportional to the sum of said stored outputs during a subsequent period during which said gyroscope's pickoff output is being used to energize said platform torquer whereby excursions of said platform from an unstabilized position are reduced to a minimum.

4. In combination with a gyro stabilization system including two parallel input axis reversing rotor gyroscopes, a device to be stabilized alternately thereby, pickoffs having electrical signal outputs and torquers arranged on the precession axes of each said gyroscope, and means for torquing the device to be stabilized, smoothing means comprising means for storing the output of each said pickoff during periods in which the gyroscope to which it is attached is not stabilizing said platform, and means for correctively torquing each said gyroscope while it is being used for stabilization of said device by an amount which is a function of said stored output.

5. A device as recited in claim 4 in which said means for storing comprises a plurality of adjustable voltage sources and comparator means for comparing said pickoff output with each said voltage source and for adjusting the magnitude of said voltage source to be equal in magnitude and opposite in sign to said pickoff output.

6. A device as recited in claim 4 in which said storing means comprises a plurality of adjustable potentiometers, motor means for adjusting said potentiometers, and comparator means for energizing said motors until the output of said potentiometers is equal in magnitude but opposite in sign to the output of said pickoff.

7. Apparatus for reducing the error drift excursions of a single axis gyro-stabilized platform comprising two gyroscopes mounted on said platform with parallel output axes and the axis of angular freedom of said platform as their common input axis, each of said gyroscopes having a pickoff with an electric signal output positioned about its output axis, means for causing each said gyroscope to periodically reverse spin direction, means for alternately torquing each gyroscope about its own output axis in response to its own pickoff while spinning in each direction, means for torquing said platform in response to the pickoff of the gyroscope not being torqued in response to its own pickoff, means for storing voltages which are a predetermined function of the electric signal outputs of each gyroscope's pickoff while said torques are being applied to each gyroscope's own output axis in response to its own pickoff for each direction of spin, and means responsive to said storing voltage means for applying to the output axis of each said gyroscope a torque which is a predetermined function of the algebraic sum of said stored voltages but opposite in sense thereto while said platform is being torqued in response to the pickoff of that gyroscope to thereby reduce the error drift excursions of said platform.

8. In combination with a device to be stabilized about an axis in space, two gyroscopes with a common input axis defined by said axis in space and parallel output axes, means for controlling the orientation of said device about said axis in space alternately in response to each of said gyroscopes, means for reversing spin directions of said gyroscopes periodically, and means for applying torque to the output axis of each gyroscope while it is in control of the orientation of said device equal to but opposite in sign to the algebraic sum of torques required to cage said gyroscope to said device in each spin direction thereof while it is not in control of said device to thereby stabilize said device.

9. A device as recited in claim 8 in which said torque applying means comprises an output axis torquer on each said gyroscope, and means for storing voltages which are a predetermined function of the magnitude of torque required to cage each said gyroscope for each spin direction of said gyroscope.

10. A device as recited in claim 8 and further comprising means for caging each of said gyroscopes while not controlling the orientation of said device and in which sad torque applying means comprises an output axis torquer on each said gyroscope, a first potentiometer one terminal of which is supplied with constant voltage, means for turnnig said potentiometer until the output voltage thereof is a predetermined function of the torque produced by the torquer on the first of said gyroscopes while it is being caged and spun in one direction, a second potentiometer one terminal of which is supplied wtth said constant voltage, means for turning said second potentiometer until the output voltage thereof is a predetermined function of the torque produced by the torquer on the first of said gyroscopes while it is being caged and spun in the opposite direction, a third potentiometer one terminal of which is supplied with said constant voltage, means for turning said third potentiometer until the output voltage thereof is a predetermined function of the torque produced by the torquer on the second of said gyroscopes while it is being caged and spun in one direction, a fourth potentiometer one terminal of which is supplied with said constant voltage, means for turning said fourth potentiometer until the output voltage thereof is a predetermined function of the torque produced by the torquer on the second of said gyroscopes while it is being caged and spun in the opposite direction, means for summing algebraically the outputs of said first and second potentiometers and for applying said sum to the torque of said first gyroscope while it is in control of said device, and means for summing algebraically the outputs of said third and fourth potentiometers and for applying said sum to the torquer of said second gyroscope while it is in control of said device to thereby stabilize said device with minimum excusions from stabilized condition.

11. A smoothing system for eliminating the excursions of a device being stabilized comprising a pair of gyroscopes for sensing stabilization errors of the device to be stabilized, pickoff means on each of said gyroscopes for producing electric signals indicative of said stabilization errors, torquer means for applying corrective torques to said device, means coupling each of said pickoff means to said torquer means alternately, means for storing the unapplied signal output of the pickoff means of the gyroscope not connected to control said torquer means, and means for modifying the subsequent motion of said gyroscope when it is returned to control by an amount which is a predetermined function of said stored signal to thereby reduce the excursions of said device to a minimum.

12. A gyroscope having a rotor and means for reversing the spin direction thereof, means for applying caging torques to said rotor in each spin direction thereof, means responsive to said second mentioned means for storing signals indicative of said caging torque in each said direction, and means responsive to said storing means for torquing said gyroscope in accordance with said stored signals.

References Cited in the file of this patent
UNITED STATES PATENTS

| | | |
|---|---|---|
| 2,204,206 | Brunner | June 11, 1940 |
| 2,374,152 | Grimm | Apr. 17, 1945 |
| 2,414,291 | Evans | Jan. 14, 1947 |
| 2,470,773 | Haskins | May 24, 1949 |
| 2,566,305 | Beacon | Sept. 4, 1951 |
| 2,567,948 | Lane | Sept. 18, 1951 |
| 2,591,697 | Hays | Apr. 8, 1952 |
| 2,592,417 | Hale | Apr. 8, 1952 |

UNITED STATES PATENT OFFICE
CERTIFICATE OF CORRECTION

Patent No. 3,029,647                           April 17, 1962

Joseph E. Picardi et al.

It is hereby certified that error appears in the above numbered patent requiring correction and that the said Letters Patent should read as corrected below.

Column 2, line 40, the equation should appear as shown below instead of as in the patent:

$$M_{1b} = M_{u(1)} - H_1 \dot{\phi}$$

column 6, line 28, for "56" read -- 26 --; column 7, line 41, for "caking" read -- caging --; column 9, line 29, for "sad" read -- said --; line 32, for "turnnig" read -- turning --; line 36, for "wtth" read -- with --; column 10, line 7, for "torque" read -- torquer --.

Signed and sealed this 23rd day of June 1964.

(SEAL)
Attest:

ERNEST W. SWIDER                           EDWARD J. BRENNER
Attesting Officer                            Commissioner of Patents